United States Patent Office 3,714,239
Patented Jan. 30, 1973

3,714,239
PREPARATION OF 2-PHENETHYL-5-TRIFLUORO-
METHYLBENZOIC ACID
Edward L. Engelhardt, Gwynedd Valley, Pa., assignor to
Merck & Co., Rahway, N.J.
No Drawing. Original application May 31, 1966, Ser. No.
553,656, now Patent No. 3,499,037, dated Mar. 3,
1970. Divided and this application Oct. 8, 1969, Ser.
No. 864,907
Int. Cl. C07c 63/12
U.S. Cl. 260—515 A                          1 Claim This application is a division of United States application Ser. No. 553,656 filed May 31, 1966.

This invention relates to derivatives of dibenzocycloheptenes, and in particular to the preparation of trifluoromethyl substituted dibenzocyclohepten-5-ones.

The trifluoromethyl dibenzocyclohepten-5-ones of the present invention may be represented structurally as follows:

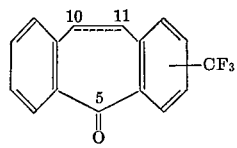

The dotted line in the above formula indicates that the compounds may be saturated or unsaturated at the designated positions.

The compounds represented above are useful as intermediates for the preparation of trifluoromethyl substituted dibenzocycloheptenes such as 5-(3-dimethylaminopropylidene)-3-trifluoromethyl-5H-dibenzo[a,d]cycloheptene, 5-(3-dimethylaminopropylidene) - 3-trifluoromethyl-10,11-dihydro-5H-dibenzo[a,d]-cycloheptene and 5-(3-dimethylaminopropyl) - 3-trifluoromethyl-10,11-dihydro-5H-dibenzocycloheptene having respective structural formulae as follows:

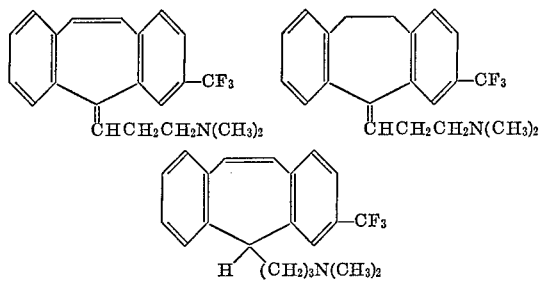

which have activity as tranquilizers and/or antidepressants.

The compounds of the present invention are prepared by either of the two alternate routes illustrated below.

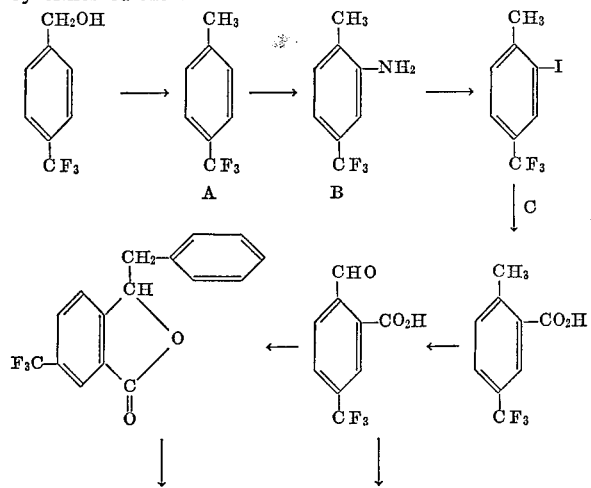

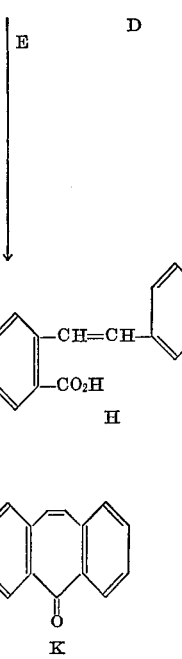

The preparation of p-trifluoromethyltoluene, designated A in the above scheme is conducted by the hydrogenation of trifluoromethylbenzylalcohol preferably catalytically and preferably with hydrogen over palladium oxide in a liquid organic acid such as acetic acid. The hydrogenation is carried out at any temperature, but most readily at ambient temperature and a pressure from atmospheric pressure to about 100 p.s.i., 30–50 p.s.i. being satisfactory. 5-trifluoromethyl-o-toluidine, designated B in the above sequence is prepared by nitration of A by conventional methods, such as with nitric acid in sulfuric acid followed by hydrogenation of the nitro group, preferably catalytically, and preferably with hydrogen over a platinum catalyst in a liquid organic acid such as acetic acid.

A conventional Sandmeyer reaction on the compound designated B involving diazotization followed by treatment with an alkali metal iodide such as potassium iodide produces 2-iodo-4-trifluromethyl toluene, designated C.

The preparation of 5-trifluoromethyl-o-toluic acid, designated D in the above scheme is conducted by preparation of a Grignard reagent from compound C by conventional means followed by carbonation with carbon dioxide.

The preparation of 5-trifluoromethylphthalaldehydic acid, designated E is prepared by treatment of D with excess thionyl chloride, or with thionyl chloride in an inert hydrocarbon solvent such as benzene at ordinary temperatures followed by treatment of this product with an N-halo amide such as N-bromosuccinimide under the influence of ultraviolet irradiation. The halogenated product is then treated with a solution of an alkali metal alcoholate in a lower alcohol, such as sodium methoxide in methanol, with cooling, followed by heating with a mineral acid, for example by refluxing with hydrochloric acid, and isolation of the product, which is facilitated by employing the bisulfite addition compound as an intermediate.

The compound 3-benzyl-6-trifluoromethylphthalide designated F in the reaction scheme is prepared by the addition of a benzyl magnesium halide, preferably benzyl magnesium chloride, prepared by standard techniques, to 5-trifluoromethylphthalaldehydic acid (E) and decomposition of the complex with mineral acid.

The preparation of 2-phenethyl-5-trifluoromethylbenzoic acid, designated as G in the above scheme is conducted by opening the ring of the lactone F to an alkali metal salt of the acid, designated L, and hydrogenating, preferably over a palladium catalyst in a basic medium, such as with an alkali metal hydroxide in absolute alcohol.

An alternate method of preparing 2-phenethyl-5-trifluoromethylbenzoic acid (G) is via 4-trifluoromethylstilbene-2-carboxylic acid designated as H. In this case a Wittig reaction is employed in which the reagent benzylidenetriarylphosphorane is prepared from dimethyl sulfinyl carbanion, prepared from an alkali metal hydride in dimethyl sulfoxide, and a benzyltriarylphosphonium halide, for example benzyltriphenylphosphonium chloride, although any aryl group is satisfactory as they themselves do not take part in the reaction.

An alkali metal salt of 5-trifluoromethylphthalaldehydic acid (E) is added to the above reagent to give the intermediate 4-trifluoromethyl-stilbene-2-carboxylic acid (H). This intermediate is then hydrogenated, preferably catalytically, and preferably with hydrogen over a palladium catalyst in aqueous alkali, to the intermediate product G.

The preparation of 3-trifluoromethyl-10,11-dihydro-5H-dibenzo[a,d]cyclohepten-5-one, designated J in the above sequence may be prepared by cyclodehydration of 2-phenethyl-5-trifluoromethylbenzoic acid (G) for example in trifluoroacetic anhydride with boron trifluoride as catalyst.

The final product, 3-trifluoromethyl-5H-dibenzo[a,d]cyclohepten-5-one, designated K is prepared by bromination of the dihydro compound (J) with an N-bromoamide such as N-bromosuccinimide in the presence of a free radical catalyst such as benzoyl peroxide in an inert solvent such as carbon tetrachloride, chloroform, methylene chloride, benzene, toluene and the like. The crude brominated product after isolation is dehydrobrominated with base, preferably an organic base, such as a trialkylamine, for example triethylamine.

The following example illustrates the preparation of the subject compounds and their intermediates.

EXAMPLE 1

3-trifluoromethyl-5H-dibenzo[a,d]cyclohepten-5-one (A) p - Trifluoromethyltoluene.—p - Trifluoromethylbenzyl alcohol (82.25 g., 0.467 mole) is dissolved in 165 ml. of glacial acetic acid, 1.78 g. of palladium monoxide catalyst is added and the mixture is hydrogenated at 25° C. and 40 p.s.i. After separating the catalyst, the filtrate is added dropwise to a stirred solution of 346 ml. of 10 N potassium hydroxide maintained below 10° C. by cooling in an ice-salt mixture. The product is extracted with three 40 ml. portions of petroleum ether (B.P. 30–40° C.). The combined extracts are washed with water, dried over anhydrous sodium sulfate, and then distilled through a spinning band distilling column. The product boils at 129–130° C. $n_D^{24.5}$ 1.4276, and weighs 61.42 g. (82%).

Analysis of a center-cut.—Calcd. for $C_8H_7F_3$ (percent): C, 60.01; H, 4.41; F, 35.59. Found (percent): C, 59.83; H, 4.51; F, 35.76.

(B) 5-trifluoromethyl-o-toluidine.—p-Trifluoromethyltoluene (47.62 g., 0.298 mole) is dissolved in 96 ml. of concentrated sulfuric acid and treated with a solution of concentrated nitric acid (70–71%) (29.6 g., 0.328 mole) in 61.8 g. of concentrated sulfuric acid that is added dropwise over forty minutes with stirring and cooling in an ice-bath. The mixture then is stirred in the ice-bath for thirty minutes, slowly allowed to warm to 23 to 26° C., and stirred at 23–26° C. for twenty-one hours. The reaction mixture is poured carefully into 350 ml. of ice and water and extracted with three 200 ml. portions of methylene chloride. The combined extracts are washed twice with 200 ml. portions of water, three times with saturated sodium bicarbonate solution and three times with 300 ml. portions of water. After drying over anhydrous sodium sulfate, the solvent is distilled at atmospheric pressure. The orange liquid residue is dissolved in 290 ml. of glacial acetic acid and hydrogenated at 25° C. and 50 p.s.i. over 4.4 g. of 5% platinum-on-carbon catalyst. The catalyst then is separated, the solution treated with 36.5 ml. of 10.2 N ethanolic hydrogen chloride solution (0.372 mole, 25% excess) and evaporated under reduced pressure on the steam-bath. The tan solid residue is recrystallized from isopropyl alcohol, yielding 41.96 g. of product melting at 249.5–253.5° C. (due to sublimation, it is necessary to determine melting points in sealed capillary tubes). Concentration of the mother liquors yields an additional 10.96 g. of product melting at 248.5–251° C. (overall yield is 84%). An analytical sample from another experiment melts at 249–251.5° C. after recrystallization from isopropyl alcohol.

Analysis.—Calcd. for $C_8H_8F_3N \cdot HCl$ (percent): C, 45.40; H, 4.29; N, 6.62. Found (percent): C, 45.58; H, 4.43; N, 6.82.

(C) 2 - iodo - 4 - trifluoromethyltoluene.—A suspension of 5 - trifluoromethyl - o - toluidine hydrochloride (67.73 g., 0.32 mole) in 810 ml. of water and 122 ml. of concentrated hydrochloric acid is cooled to —3° C. in an ice-salt bath. A solution of 22.35 g. of sodium nitrite in 81 ml. of water is added below the liquid surface over twenty minutes with stirring. The orange solution is stirred in the ice-salt bath for one hour and then is treated with a solution of 81 g. of potassium iodide in 240 ml. of water. Considerable gas evolution occurs and a brown precipitate separates. The mixture is stirred in an ice-salt bath for one hour and then heated on a steam-bath for two hours. After discharging the iodine color with 20% sodium bisulfite solution, the mixture is steam-distilled, collecting approximately four liters of distillate. The product is extracted with four 800 ml. portions of methylene chloride. The combined extracts are dried over anhydrous sodium sulfate and the solvent is distilled at atmospheric pressure. The red liquid residue is distilled under reduced pressure and the product, boiling at 66° C./4.8 mm., weighs 67.74 g. (74%). An analytical sample from another experiment boils at 64–65° C./4.8 mm.; $n_D^{25}$ 1.5226.

Analysis.—Calcd. for $C_8H_6F_3I$ (percent): C, 33.59; H, 2.11; I, 44.37. Found (percent): C, 33.93; H, 2.41; I, 44.20.

(D) 5-trifluoromethyl-o-toluic acid.—Magnesium turnings (27.7 g., 1.14 g. atoms), a crystal of iodine, 2.5 ml. of bromoethane and 20 ml. of tetrahydrofuran are treated with 3 ml. of a solution of 32.69 g. (0.114 mole) of 2-iodo-4-trifluoromethyltoluene in 130 ml. of tetrahydrofuran. The mixture is stirred slowly at room temperature for approximately five minutes to initiate the reaction. The remainder of the iodo-compound is added over thirty minutes at such a rate that gentle refluxing is maintained. The mixture then is refluxed on a steam-bath for 90 minutes with stirring, cooled in an ice-salt bath to —5° C. and dry carbon dioxide is bubbled into the mixture for 2.5 hours, maintaining the temperature below 5° C. With continued cooling, the mixture is hydrolyzed by the dropwise addition of 133 ml. of 6 N hydrochloric acid. Unreacted magnesium is separated by filtration, the filtrate is extracted with three 400 ml. portions of ether, and the combined extracts then are extracted three times with 200 ml. portions of 5% sodium hydroxide. The combined alkaline extracts are warmed on a steam-bath for 90 minutes while passing a stream of nitrogen over the solution to remove ether. The turbid solution is filtered, and the clear yellow filtrate is acidified with 3 N hydrochloric acid. The white solid is collected, washed by suspension in water and dried in a vacuum desiccator, first, over concentrated sulfuric acid and, finally, over phosphorous pentoxide. The yield of product melting at 123–124.5° C. is 16.15 g. (69%). An analytical sample from another experiment melts at 123.5–125° C. after sublimation at 105° C. and 40 mm.

Analysis.—Calcd. for $C_9H_7F_3O_2$ (percent): 52.95; H, 3.46; F, 27.92. Found (percent): C, 53.14; H, 3.61; F, 27.71.

(E) 5 - trifluoromethyl - phthalaldehydic acid.—5-trifluoromethyl-o-toluic acid (20.53 g., 0.10 mole) is dissolved in 300 ml. of thionyl chloride and the solution is refluxed for one hour. The excess thionyl chloride is distilled under reduced pressure below 40° C. The brown liquid residue is dissolved in 510 ml. of carbon tetrachloride, N-bromosuccinimide (37.38 g., 0.21 mole) is added and the mixture is stirred and refluxed for forty-one hours under ultraviolet irradiation. Succinimide is removed by filtration and the filtrate is distilled under reduced pressure at 45–50° C. to remove carbon tetrachloride. The red oily residue is dissolved in 150 ml. of anhydrous ether and the solution is added dropwise with stirring to 400 ml. of 1.016 N methanolic sodium methoxide solution while cooling in a solid carbon dioxide-acetone mixture. A precipitate separates immediately and the mixture is stirred at room temperature for ten hours. The ether is distilled and the mixture then is refluxed for 1½ hours. Water, 250 ml., is added and refluxing is continued for two hours followed by the addition of 104 ml. of 6 N hydrochloric acid and an additional hour of refluxing. Methanol is distilled under reduced pressure and the residue is distributed between 225 ml. of methylene chloride and 200 ml. of water. The aqueous layer is separated and again extracted with methylene chloride. The combined methylene chloride extracts are washed once with water, then extracted three times with 250 ml. portions of saturated sodium bicarbonate solution and washed three times with water. The combined bicarbonate extracts and washings are acidified with 6 N hydrochloric acid and extracted with three 250 ml. portions of methylene chloride. After washing with water, the combined methylene chloride extracts are extracted three times with 200 ml. portions of 20% sodium bisulfite solution. The combined bisulfite extracts are acidified with 180 ml. of concentrated hydrochloric acid and then evaporated under reduced pressure on the steam-bath. The yellow solid residue is suspended in 500 ml. of 6 N hydrochloric acid and refluxed for 2½ hours with stirring. The reaction mixture is poured into 300 ml. of water, extracted three times with benzene and the combined extracts are washed with water. After drying over anhydrous magnesium sulfate, the benzene is evaporated under reduced pressure leaving a pale yellow solid as residue. The product weighs 6.66 g. (31%) and melts at 112.5–114.5° C. An analytical sample melts at 114–115° C. after recrystallization from water.

*Analysis.*—Calcd. for $C_9H_5F_3O_3$ (percent): C, 49.55; H, 2.31; F, 26.13. Found (percent): C, 49.60; H, 2.51; F, 26.44.

(F) 3-benzyl-6-trifluoromethylphthalide.—Magnesium turnings (0.96 g., 0.0396 g. atom) and a crystal of iodine are covered with 4 ml. of anhydrous ether and to the mixture is added 2 ml. of a solution of 5.01 g. (0.0396 mole) of benzyl chloride in 20 ml. of anhydrous ether. The reaction begins immediately and the remainder of the benzyl chloride solution is added dropwise over thirty minutes, occasionally moderating the reaction by cooling in an ice bath when refluxing becomes vigorous. The mixture is refluxed on a steam bath for thirty minutes, and the solution of benzylmagnesium chloride then is transferred to a dropping funnel under nitrogen. The Grignard reagent is added dropwise over thirty minutes to a stirred solution of 2.17 g. (0.0099 mole) of 5-trifluoromethyl-phthalaldehydic acid in 24 ml. of dry tetrahydrofuran while cooling in an ice bath. The red solution is stirred at room temperature for one hour, then cooled in an ice bath and the Grignard adduct is hydrolyzed by the dropwise addition of 10 ml. of 6 N hydrochloric acid. The solvent is evaporated under reduced pressure below 40° C. and the residue is distributed between ether and water. The ether layer is separated and washed twice with water, extracted three times with saturated sodium bicarbonate solution and washed three times with water. After drying over anhydrous magnesium sulfate and evaporating the solvent under reduced pressure on the steam-bath, a yellow oily residue, which is a mixture of 3-benzyl-6-trifluoromethyl-phthalide and dibenzyl, is obtained.

(G) 2-phenethyl-5-trifluoromethylbenzoic acid.—The residue is dissolved in 50 ml. of absolute ethanol and treated with 7.0 ml. of 1.29 N ethanolic sodium hydroxide solution. The solution is hydrogenated at 70° C. and 45 p.s.i. over 2 g. of 10% palladium on carbon catalyst. After four hours, an additional 2 g. of catalyst is added and the hydrogenation is continued for 16 hours. The catalyst is separated by filtration, the solution is acidified with 5 ml. of 7.1 N ethanolic hydrogen chloride solution and evaporated under reduced pressure on the steam-bath. The residue is distributed between 40 ml. of ether and 40 ml. of water, the aqueous layer is separated and again extracted with 40 ml. of ether. The combined ether extracts are extracted with three 40 ml. portions of 5% sodium hydroxide solution and washed four times with water. The combined alkaline extracts and washings are acidified with 3 N hydrochloric acid and extracted with three portions of methylene chloride. After washing with water and drying over magnesium sulfate, the methylene chloride is evaporated under reduced pressure leaving a pale yellow solid residue weighing 1.27 g. The residue is combined with 0.37 g. of material from a previous preparation and sublimed at 115–120° C./0.3 mm. The product is a white solid weighing 1.03 g. and melting at 111–114° C. An analytical sample melts at 114.5–116° C. after recrystallization from hexane.

*Analysis.*—Calcd. for $C_{16}H_{13}F_3O_2$ (percent): C, 65.30; H, 4.45; F, 19.37. Found (percent): C, 65.23; H, 4.40; F, 19.30.

(H) 4 - trifluoromethylstilbene - 2 - carboxylic acid.— Sodium hydride (2.5 g., 0.055 mole) (53.5% dispersion in mineral oil) and 25 ml. of dimethylsulfoxide are stirred and heated at 73° C. under a nitrogen atmosphere until hydrogen evolution is complete (one hour). The turbid solution is cooled to room temperature and diluted with 25 ml. of dimethylsulfoxide. An aliquot of the solution is diluted with water and titrated with dilute sulfuric acid to a phenolphthalein endpoint. The solution is 1.033 N in dimethylsulfinyl carbanion.

(Benzyl) - triphenylphosphonium chloride (20.0 g., 0.0518 mole) is suspended in 50 ml. of dimethylsulfoxide and 50 ml. of 1.033 N dimethylsulfinyl carbanion solution (0.0517 mole) is siphoned under nitrogen into the stirred suspension at room temperature. A deep red solution results containing an orange precipitate. The mixture is diluted with 20 ml. of dimethylsulfoxide and stirred at 23–26° C. for thirty minutes.

5-trifluoromethylphthalaldehydic acid (4.93 g., 0.0226 mole) is dissolved in 20 ml. of tetrahydrofuran and the solution is added dropwise over twenty minutes to a stirred suspension of 1.04 g. (0.0226 mole) of sodium hydride (53.5% dispersion in mineral oil) in 20 ml. of tetrahydrofuran with cooling in an ice bath. Hydrogen evolution is vigorous and a clear yellow solution results when addition is complete. The solution is allowed to warm to room temperature and a white precipitate separates. The solvent is removed under reduced pressure below 35° C., the white amorphous solid is dissolved in 25 ml. of dimethylsulfoxide and the solution is added dropwise to the stirred dark red phosphorane solution while cooling in an ice bath. The mixture is stirred at 23–26° C. for five hours, and then at 73° C. for eleven hours in a nitrogen atmosphere. Propionaldehyde is added dropwise until the red color is just discharged, and the dimethylsulfoxide is istilled under reduced pressure. The residue is dissolved in 150 ml. of benzene, 170 ml. of water an 25 ml. of 5% sodium hydroxide solution are added. The aqueous layer is separated and washed six times with 150 ml. portions of benzene. The yellow aqueous solution is acidified with 6 N hydrochloric acid and extracted with three 100 ml. portions of methylene chloride. The combined extracts are washed with water, dried over anhydrous magnesium sulfate, and the solvent is evaporated under reduced pressure. The oily solid residue of 4-trifluoromethylstilbene-2-carboxylic acid weighs 2.67 g.

(I) 2 - phenethyl-5-trifluoromethylbenzoic acid.—The stilbenecarboxylic acid (2.27 g., 0.0078 mole) is dissolved in 78 ml. of 0.1 N sodium hydroxide solution and reduced on a hydrogenation apparatus at room temperature and 36 p.s.i. over 1 g. of 10% palladium on carbon catalyst. The catalyst is removed by filtration, the filtrate is acidified with 3 N hydrochloric acid and extracted three times with methylene chloride. The solvent is evaporated under reduced pressure and the product, 2-phenethyl-5-trifluoromethylbenzoic acid, weighs 1.77 g., and melts at 111.5–113° C. Sublimation of the product at 120° C./0.2 mm. yields 1.74 g. of material melting at 112.5–114° C.

(J) 3 - trifluoromethyl-10,11-dihydro-5H-dibenzo[a,d]cyclohepten-5-one.—2-phenethyl - 5 - trifluoromethylbenzoic acid (1.74 g., 0.0059 mole) is dissolved in 25 ml. of trifluoroacetic anhydride and a stream of boron trifluoride is passed in for fifteen minutes at 23–26° C. The mixture, containing a yellow precipitate, is stirred at room temperature for approximately fifteen hours and then poured into 50 ml. of ice and water. The product is extracted with three 40 ml. portions of ether, the combined extracts are washed twice with 5% sodium hydroxide solution, twice with saturated sodium bicarbonatae solution, three times with water and dried over magnesium sulfate. The ether is evaporated under reduced pressure. The product is a yellow oil weighing 1.68 g.

(K) 3 - trifluoromethyl-5H-dibenzo[a,d]cyclohepten-5-one.—3-trifluoromethyl-10,11-dihydro - 5H-dibenzo[a,d]cyclohepten-5-one (10.00 g., 0.0362 mole), N-bromosuccinimide (6.44 g., 0.0362 mole) and carbon tetrachloride, 125 ml., are placed in a 500 ml. flask equipped with a stirrer and a reflux condenser. Benzoyl peroxide, 75 mg., is added and the mixture stirred and cautiously heated to refluxing. After approximately ten minutes, the reaction becomes vigorous and bromine is liberated. A white precipitate of succinimide begins to separate and the color fades to yellow. After stirring at reflux for three hours, the reaction mixture is cooled to room temperature, the succinimide separated by filtration and the filtrate extracted with four 20 ml. portions of 1.25 N sodium hydroxide solution. After washing with water and drying over anhydrous magnesium sulfate, the solvent is distilled on the steam bath under reduced pressure. The pale yellow oily residue, weighing 12.20 g., is warmed and added to 125 ml. of triethylamine. Heat is liberated and a solid separates. The mixture is heated to refluxing with stirring for 10 hours. After cooling to room temperature, the mixture is filtered and the precipitatae washed with benzene. The combined filtrate and washings are concentrated on the steam bath under reduced pressure and the oily, tan solid residue is dissolved in 200 ml. of benzene. The solution is washed with three 50 ml. portions of water, twice with 25 ml. of 3 N hydrochloric acid, four times with 50 ml. portions of water and dried over anhydrous sodium sulfate. The benzene is distilled under reduced pressure leaving a slightly oily, tan solid as residue. This product weighs 9.9 g. Recrystallization from cyclohexane gives 7.26 (75%) of product, M.P. 117.5–119° C. An analytical sample from another experiment melts at 118–119° C.

*Analysis.*—Calcd. for $C_{16}H_9F_3O$ (percent): C, 70.07; H, 3.31; F, 20.79. Found (percent): C, 70.10; H, 3.23; F, 20.68.

What is claimed is:
1. A process for the preparation of the compound of structural formula

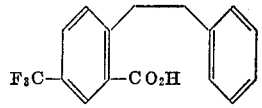

which comprises hydrogenating in the presence of a palladium catalyst in a basic medium the compound of structural formula

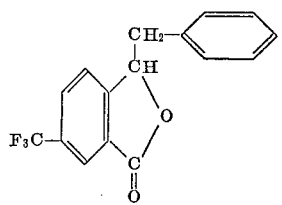

References Cited

UNITED STATES PATENTS 3,116,324  12/1963  Dolliver _____ 260—515 A
3,452,009  6/1969   Wendler.

JAMES A. PATTEN, Primary Examiner

U.S. Cl. X.R.

204—158 HA; 260—192, 520, 578, 645, 651 F